Dec. 15, 1925.

G. A. FULLIPS

CONVEYER

Filed Oct. 9, 1924    2 Sheets-Sheet 1

1,565,922

Inventor
George A. Fullips
By [signature]
Attorneys

Witness
Erwin B. Ering

Dec. 15, 1925.
G. A. FULLIPS
CONVEYER
Filed Oct. 9, 1924 — 2 Sheets-Sheet 2
1,565,922
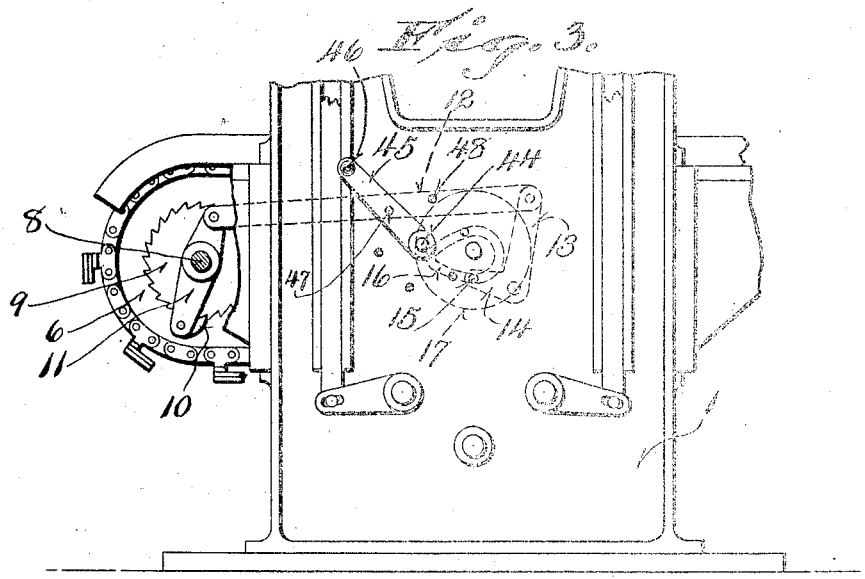
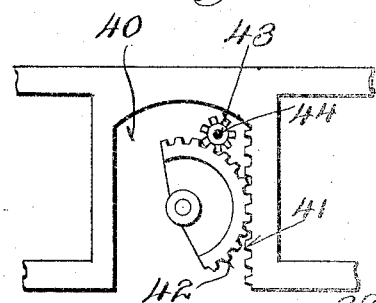
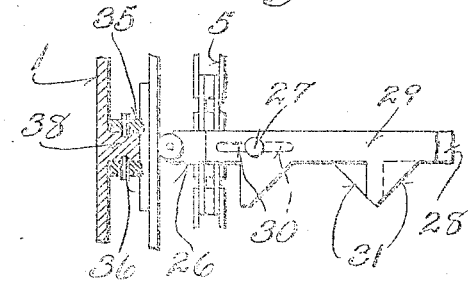
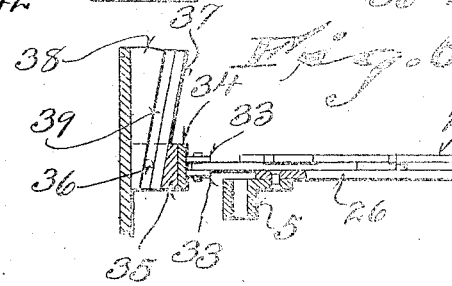
Witness!
Erwin B. Giring
Inventor!
George A. Fullips
By his Attorneys Patented Dec. 15, 1925.

1,565,922

UNITED STATES PATENT OFFICE.

GEORGE A. FULLIPS, OF MILWAUKEE, WISCONSIN.

CONVEYER.

Application filed October 9, 1924. Serial No. 742,621.

*To all whom it may concern:*

Be it known that GEORGE A. FULLIPS, a citizen of the United States, and resident of Milwaukee, in the county of Milwaukee and State of Wisconsin, have invented certain new and useful Improvements in Conveyers; and I do hereby declare that the following is a full, clear, and exact description thereof.

This invention relates to conveyers, and is particularly directed to a conveyer adapted for handling bottles such for example as a conveyer employed in a milk bottling machine, for instance as disclosed in my copending application, Serial Number 680,407, filed December 13, 1923, for machines for filling and capping bottles.

In machines of this type difficulty has been experienced due to the fact that the bottles were fed in a jerky manner and at a relatively rapid rate.

These bottles were fed in the machines heretofore constructed in a single row and, as stated, in order to bring up the capacity of the machine to somewhere near a reasonable amount a relatively high speed of conveying had to be attained. Obviously, this jerky high speed conveying of the bottles resulting in tipping and breaking a number of bottles, and in producing a lack of alignment between the bottles and the filling and capping mechanisms resulting in further breakage. Also the machines did not accurately center the bottles under normal conditions and were not adapted to the handling of different sizes of bottles with the automatic adjustment of the conveyer to the different sizes, so as to insure the correct aligning of the bottles with the filling and capping device irrespective of their sizes.

This invention is designed to overcome the above noted defects and objects of such invention are to provide a conveyer for bottle filling and capping machines which will convey a multiplicity of rows of bottles in a smooth and uniform manner without any jerky motion, which will insure the accurate centering of the bottles in each row so that the simultaneous filling or capping of the bottles may be easily effected, and in which the motion of feed is not so sudden as to upset the bottles although the quantity or total output of the machine is greater than that of the single row conveyers heretofore used.

Further objects are to provide a conveyer for a bottle filling machine which will adjust itself automatically to the sizes of the bottles as the machine table is raised or lowered to receive such different sizes of bottles, and which will automatically center the bottles irrespective of their sizes, so that the center lines of the bottles occupy identically the same positions with reference to the elements of the conveyers for all sizes of bottles handled by the machine.

An embodiment of the invention is shown in the accompanying drawings, in which:—

Figure 3 is a fragmentary end view of the machine showing the actuating cam and levers in dotted lines.

Figure 4 is a detail of the machine bed raising or adjusting means.

Figure 5 is a fragmentary view of one end of a conveyer element showing the associated portions of the machine in section.

Figure 6 is an elevation of the structure shown in Figure 5.

Figure 1:
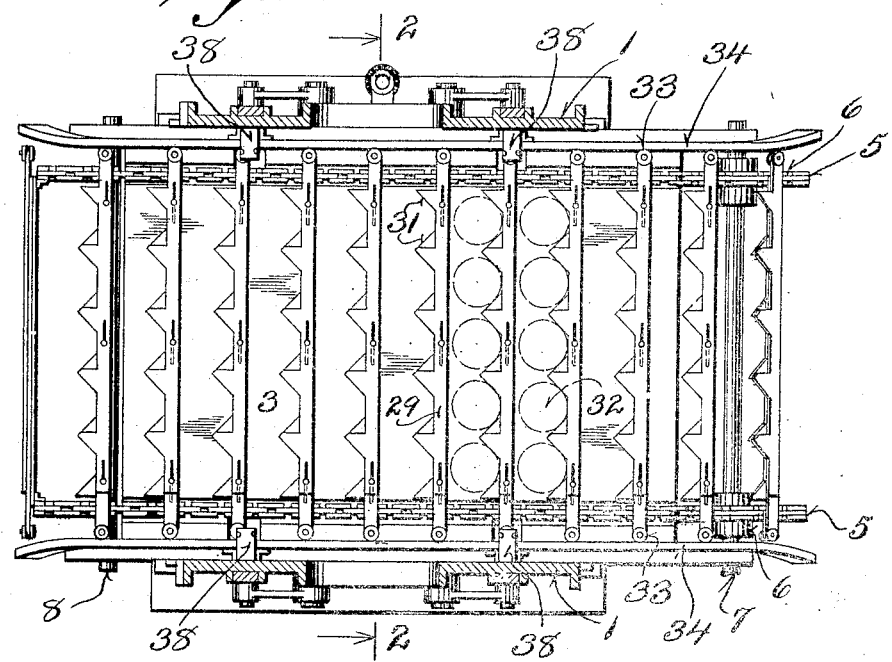
Figure 1 is a sectional plan view through a milk filling and capping machine showing the conveyer in position and in dotted lines showing a view of the bottles as they appear in reference to the conveyer.

The machine comprises a pair of side frames 1 which extend throughout the major portion of the machine and are rigidly carried by a base 2. These side frames guide and carry a movable bed plate 3 (see Figure 2) upon which the conveyer and bottles are adapted to travel. This bedplate is preferably rectangular in cross section so as to provide the requisite strength and the bed plate is provided with depressed or grooved portions within which chains 5 are adapted to slide. These chains 5 form endless bands which pass over end sprocket wheels 6 arranged in pairs at each end of the machine. These sprocket wheels are carried by end shafts 7 and 8 which are rigidly attached thereto and which are journaled in the movable bed of the machine. The shaft 8 rigidly carries a ratchet wheel 9 (see Figure 3) which is actuated by means of the pawl 10 carried by one arm of a lever 11 loosely mounted upon the shaft 8. This lever is oscillated by means of a pitman 12 carried by the long arm 13 of a bell crank lever pivoted to the bed plate and provided with a shorter arm 14. This shorter arm 14 carries a roller 15 which travels in a cam slot 16 formed in the cam 17 so that when such cam rotates the lever 11 is rocked periodically and the sprocket wheels carried by the shaft 8 and consequently the conveyer will give a step by step smooth uniform motion. The contour of the cam is such that abrupt startings and stoppings are avoided and also a dwell is produced at stage in the cycle of operations.

The cam 17 is rigidly secured to a transverse shaft 18 carried by the movable bed and such shaft is provided with a bevel gear 19 which meshes with a bevel gear 20 carried by a vertical shaft 21. This vertical shaft is slidably splined to a bevel gear 22 (see Figure 2) which meshes with a bevel gear 23 rigidly carried by the drive shaft 24, such shaft being driven in any suitable manner as, for instance, through the medium of the gear 25.

Thus the lowering and raising of the table or bed plate does not interrupt the smooth operation of the conveyer and such conveyer is bodily raised and lowered in a unitary manner with the table.

The conveyor, it will be noted from Figures 1, 2, 5 and 6 is provided with a plurality of transverse rods 26 which are secured to the chains 5, as most clearly shown in Figure 6. These transverse rods carry headed pins 27 (see Figure 5). A lower bar 28 and an upper bar 29 is carried by each transverse member 26, and these bars are slotted as indicated at 30, to receive the pins 27, the heads of such pins preventing detachment of the bars, although such bars are freely slidable with reference to the transverse members 26.

These bars 28 and 29 are provided, respectively, with triangular members 30 and 31 at regular portions along their length. These triangular projections are preferably so constructed that they have approximately 45° faces between which the bottles 32 are received, as shown in dotted lines in Figure 1.

Figure 2:
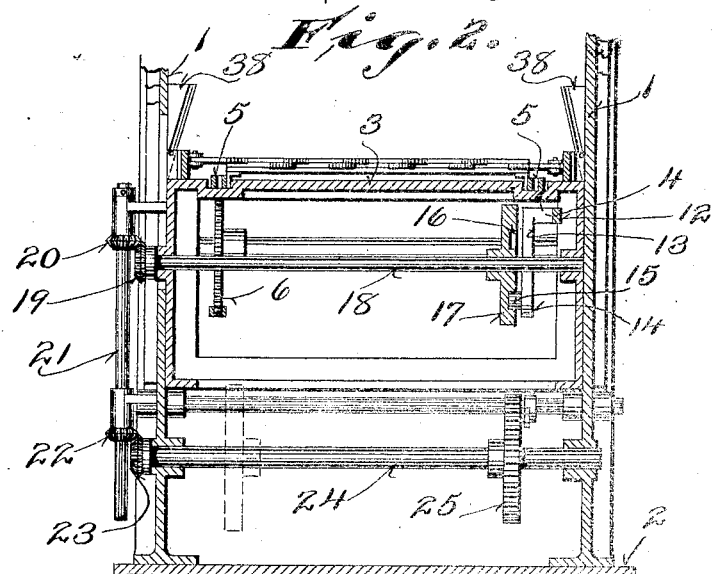
Figure 2 is a transverse sectional view on the line 2—2 of Figure 1.

The bars 28 and 29 are provided at their ends with rollers 33 which have vertical axes, as shown in Figures 1, 2, 5 and 6. These rollers contact with guide rails 34 carried by the bed plate and which are preferably provided with flared terminals to aid in guiding the bars 28 and 29 as they ride upwardly between such guide rails. These guide rails 34 are carried by cam followers 35 which are provided with inwardly extending pins 36 on opposite sides. The cam followers 35 bear against slanting faces 37 of cams 38, such cams being provided with correspondingly slanting slots 39 within which the pins slide. The cams, it will be noted from Figures 2, 5 and 6 are rigidly secured to the side frames 1 of the machine. These cams are mounted in pairs on opposite sides of the machine, as may be seen from Figure 1, and thus when the table 3 or bed plate is elevated the side rails 34 are moved inwardly. The table, it will be noted, is elevated to accommodate smaller bottles and adjust such bottles to the filling and capping means disclosed in my above noted application. As the table is raised the side rails move inwardly and slide the bars 28 and 29. This positions the adjacent pairs of triangular projections 31 in closer proximity to each other and consequently correctly centers a smaller bottle, thus maintaining the central line of the bottles in a fixed relative position to the center line of the transverse member 26 of the conveyer. This in turn insures the correct centering and aligning of the bottles irrespective of their sizes with the filling and capping means. For instance, when the machine is used as a milk bottle filling machine, quart bottles will be received when the table is in its lowest position and pints and half pints when the table is in successively higher positions. Consequently, the conveyer bars 28 and 29 are moved inwardly in proportion to the raising of the table and consequently correctly center the smaller bottles. In actual practice, this operation has been found to give eminently satisfactory results and to automatically adjust the conveyer to the particular type of bottle used.

It is further to be noted that even if the bottle is incorrectly placed with reference to a pair of triangular projections that, nevertheless, the slanting faces will correctly center the bottle as the conveyer slides the bottle along the table 3.

Any suitable means may be provided for raising and lowering the table 3. For instance a cut out, as indicated at 40, (see Figure 4) may be formed in one side wall or both side walls of the table, and a rack 41 formed in one vertical face of this cut out. This rack may be engaged by a segmental gear 42 which in turn is operated by a small pinion 43. This construction is preferably duplicated on opposite sides of the machine. The gear 43 is rigidly carried by a shaft 44 which in turn rigidly carries an external crank 45 (see Figure 3). This crank is provided with a manipulating handle 46 and with a latching pin 47 such latching pin being adapted to enter any one of a series of apertures 48 formed in the side frame 1 of the machine, and to thus lock the table in any of several adjusted positions.

It will thus be seen that a conveyer for a bottle filling and capping machine has been provided, which will automatically center the bottles, which will adjust itself to the particular size of bottle being handled by the machine, and will maintain the center line of the bottles relatively fixed with relation to corresponding portions of the conveyer irrespective of the size of the bottles, and which will advance the bottles in multiple rows in a uniform and orderly manner without sudden jerks and without danger of tipping or breaking the bottles.

For the sake of brevity, the expression bottle filling machine is used and is intended to cover bottle filling, bottle capping or other bottle handling machines of this type.

Although the invention has been described in considerable detail, it is to be understood that the invention may be variously embodied and is, therefore, to be limited only as claimed.

I claim:

1. In a bottle filling machine the combination of a horizontal table mounted for vertical adjustment between side frame members, bottle advancing means adapted to travel across said table, and means associated with said bottle advancing means for adjusting said bottle advancing means to different size bottles when said table is vertically adjusted.

2. In a bottle filling machine, the combination of side frame members, a horizontal table adjustably carried between said side frame members, a pair of chains adapted to travel across said table, sprocket wheels carried by said table and adapted to operate said chains, transverse members connecting said chains and adapted to engage said bottles, a rotary shaft carried by said table, means for imparting a step by step motion to said sprocket wheels from said rotary shaft, driving mechanism carried by said side frame members and including a vertical shaft, and means for transmitting rotary motion from said vertical shaft to said horizontal shaft irrespective of the adjustment of said table.

3. In a bottle filling machine, the combination of side frame members, driving mechanism carried thereby and having a horizontal shaft, a horizontal table positioned between said side frame members, manually controlled mechanism for adjusting the height of said table, forward and rear sprocket wheels carried by said table, chains passing over said sprocket wheels and having bottle engaging means adapted to travel across the top of said table, a pawl and ratchet mechanism associated with certain of said sprocket wheels for advancing said chains in a step by step manner, a cam and cam follower mounted upon a horizontal shaft carried by said table and operatively coupled to said pawl and ratchet means for imparting an oscillatory motion thereto, and an extensible vertical member operatively coupling said first and second mentioned horizontal shafts.

4. In a bottle filling machine, the combination of side frame members, a driving unit associated therewith and fixedly related thereto, a horizontal table mounted between said side frame members, bottle advancing means adapted to travel across said table, cam mechanism for imparting a step by step movement to said bottle advancing means and having a horizontal shaft, and extensible rotary means operatively coupling said driving unit and said cam mechanism, whereby said cam mechanism is operated independently of the height of which said table is adjusted.

5. In a bottle filling machine, the combination of a pair of side frame members, a driving unit associated therewith and having a horizontal shaft provided with a bevel gear, a vertical shaft having a bevel gear adjacent each end and slidably related to one of such gears, one of said gears meshing with said first mentioned bevel gear, a horizontal table mounted between said side frame members and carrying a horizontal shaft provided with a bevel gear meshing with one of the bevel gears of said vertical shaft, means for adjusting and locking said table at any desired height, sprocket wheels carried by said table, certain of said sprocket wheels having a pawl and ratchet mechanism associated therewith, a cam member carried by the horizontal shaft associated with said table, a follower operated from said cam and connected to said pawl and ratchet mechanism, and bottle advancing means carried by said sprocket wheels and adapted to travel across the top of said table.

6. In a bottle filling machine, the combination of a pair of side frame members, a driving unit associated therewith and having a horizontal shaft provided with a bevel gear, a vertical shaft having a bevel gear adjacent each end and slidably related to one of such gears, one of said gears meshing with said first mentioned bevel gear, a horizontal table mounted between said side frame members and carrying a horizontal shaft provided with a bevel gear meshing with one of the bevel gears of said vertical shafts, means for adjusting and locking said table at any desired height, sprocket wheels carried by said table, certain of said sprocket wheels having a pawl and ratchet mechanism associated therewith, a cam member carried by the horizontal shaft associated with said table, a follower operated from said cam and connected to said pawl and ratchet mechanism, and bottle advancing means carried by said sprocket wheels and adapted to travel across the top of said table, and means for automatically adapting the bottle advancing means for the reception of different sized bottles for different heights of adjustment for said table.

7. In a bottle filling machine, the combination of side frame members, a horizontal table carried between said side frame members and guided thereby, manually operable means for adjusting the height of said table, a pair of sprocket wheels carried by the forward and rear ends of said table, chains passing over said sprocket wheels, relatively slidable bars carried by said chains and having projections adapted to receive bottles between them, means for operating said sprocket wheels to advance said bars in a step by step manner, and cam means for moving said bars relatively to each other when said table is elevated to vary the spacing of the projecting portions of said relatively slidable bars.

8. In a machine for handling containers, the combination of a table mounted for vertical adjustment, a conveyer for advancing said containers across said table and having adjustable container engaging means controlled by the vertical adjustment of said table.

In testimony that I claim the foregoing I have hereunto set my hand at Milwaukee, in the county of Milwaukee and State of Wisconsin.

GEORGE A. FULLIPS.